United States Patent [19]

Knapp

[11] Patent Number: 4,854,347

[45] Date of Patent: Aug. 8, 1989

[54] FAUCET VALVE WITH NOISE REDUCING SLOTS AND BLADES IN PRECLOSING APERTURES

[75] Inventor: Alfons Knapp, Biberach an der Riss, Fed. Rep. of Germany

[73] Assignee: Masco Corporation, Taylor, Mich.

[21] Appl. No.: 56,085

[22] PCT Filed: May 9, 1986

[86] PCT No.: PCT/US86/01015

§ 371 Date: Jun. 1, 1987

§ 102(e) Date: Jun. 1, 1987

[87] PCT Pub. No.: WO86/07123

PCT Pub. Date: Dec. 4, 1986

[30] Foreign Application Priority Data

May 28, 1985 [IT] Italy .................... 67487 A/85

[51] Int. Cl.⁴ ............... F16K 47/02; F16K 11/078
[52] U.S. Cl. ................. 137/625.4; 137/625.17; 251/127
[58] Field of Search ........... 137/625.17, 625.4, 625.41; 251/118, 127

[56] References Cited

U.S. PATENT DOCUMENTS

| | | | |
|---|---|---|---|
| 3,736,959 | 6/1973 | Parkison | 137/625.17 |
| 4,218,041 | 8/1980 | Bernat | 251/127 |
| 4,301,836 | 11/1981 | Hunziker | 251/127 X |
| 4,325,403 | 4/1982 | Uhlmann | 137/625.17 X |
| 4,327,758 | 5/1982 | Uhlmann | 137/625.17 |
| 4,576,202 | 3/1986 | Knapp | 137/625.17 |
| 4,596,376 | 6/1986 | Knap | 251/127 |

Primary Examiner—John Rivell
Attorney, Agent, or Firm—Steven L. Permut; Malcolm L. Sutherland

[57] ABSTRACT

The mixing valve includes a fixed valve plate of hard material provided with passage openings communicating with two supply pipes, a plastic slide connected to a control mechanism and sliding against a control guide ring, and at least a movable disk of hard material fixed to the slide and having openings therethrough cooperating with the passage openings of the fixed plate so as to regulate the delivered water flow and the mixing ratio of the liquids fed in the faucet. The slide has a cavity where water is collected and at least an outlet opening facing the guide ring. The guide ring has a window facing the outlet opening of the slide and a section of slots and blades arranged like comb teeth. The slots extend themselves from the above-mentioned window toward a space surrounding the slide and communicating with a spout connection. The slots are positioned to be at least partially covered by the slide when the slide is next to the closed position by thus producing a total or partial closure device.

6 Claims, 1 Drawing Sheet

FAUCET VALVE WITH NOISE REDUCING SLOTS AND BLADES IN PRECLOSING APERTURES

TECHNICAL FIELD

The present invention relates to a mixing valve and more particularly to a single handle mixing valve having a cartridge that houses the valving elements.

BACKGROUND OF THE INVENTION

Mixing valves are widely used for household and sanitary purposes for the delivery of cold and hot water flowing from supply pipes. Commonly, these mixing valves include a fixed valve plate of hard material such as ceramic or plastic having openings communicating with two supply pipes, a control mechanism, a slide operably connected to the control mechanism, a guide ring placed above the slide, a space surrounding the slide that communicates with a spout outlet, and a movable valve plate of hard material fixed to the slide having its own openings selectively alignable with the openings of the fixed plate so as to regulate the delivered flow rate and the mixing ratio of the liquids from the two supply pipes. One such valve is shown in U.S. Pat. No. 4,325,403 issued to Uhlmann on April 20, 1982 and is incorporated herein by reference.

In some cases, these mixing valves present the particular problem of being noisy. Noise occurs when the passage of one flowing liquid is very throttled. In such conditions, in fact, the flow, throttled among the sharp edges of the disks of hard material, attains great speed and can produce cavitations by producing vibrations either directly or because of the impact of the flow against some faucet surfaces.

On the other hand, the application of the known preclosing devices makes the construction more complicated and can bring about an excessive reduction of the water flow that the faucet can deliver. In some cases, operation of a faucet is improved by inserting into suitable positions, for example, inside the slide, some metal networks, such as screens. However, these screens have a limited effectiveness, reduce the deliverable water flow, and moreover they suffer from occlusions easily, which further reduce the water flow.

What is needed is a particular structure suitable to reduce the noise of a faucet of the considered type by forming a preclosing unit able to control the flow and to decrease its vibrations when it is highly throttled, without any appreciable influence on the faucet behavior when non-throttled flows are delivered.

A structure is needed that has the above mentioned advantages which can be industrially produced without any appreciable increase of the production costs.

A structure is also needed that, while maintaining the mentioned technical advantages, provide a considerable increase in the maximum water flow of the faucet.

SUMMARY OF THE INVENTION

According to the present invention, a faucet mixing valve has a slide member fixed to the movable valve plate. The slide has a water receiving hollow communicating with the openings through the movable plate and an outlet opening through its upper surface leading to the guide ring. The guide ring has an outlet opening in the slide, and a series of parallel thin slots separated by thin blades each extending from the above mentioned outlet area to the space around the slide. The blades and slots are arranged and in position to be at least partially covered or closed by the slide when the slide is positioned to where the movable plate disk closes off or narrowly restricts the openings of the fixed plate.

The liquids flowing out of the openings of the movable plate flow through the slide hollow, being mixed in it, and then flow out of the slide through its outlet toward the slots and blades of the guide ring. The flow is directed through the slots and diverted 180° toward the area around the slide and then toward the spout connection. The thin blades in the guide ring subdivide, regulate and silence the flow at all flow conditions. When the slide is shifted toward the off position, the blades and slots of the guide ring is partially or totally covered by the slide blocking most communication to the area about the slide. Therefore, the mixed flow can be throttled by a very narrow passage that is formed between the guide ring and the slide area about the slide. Eventually the narrow passage can be formed merely by the play between the slide and the guide ring effectively reducing the flow and the vibrations.

The effect of the preclosure of the slide under the guide ring is to create a back pressure in the area where the throttled flow licks up at the sharp edges of the plates of hard material. The back pressure effectively opposes the rising of noise and cavitation or other turbulence.

On the other hand, in case of a greater delivery, the restriction of the flow coming out of the slide hollow is highly decreased during its diversion. The diversion of flow occurs in a relatively wide cavity section within the guide ring. As the slide is moved toward the full open position, the presence of the blades at the slide outlet does not significantly limit the flow delivered by the faucet because the total cross-sectional area of the uncovered slots exposed to the area about the slide is greatly increased effectively changing the narrow passage to a relatively unrestricting passage.

However, when it is necessary to increase the maximum possible flow, a second outlet opening can be made in the slide and positioned under the side of the guide ring opposed to the side where the blades are located. The second outlet selectively aligns with a notch in the bottom of the guide ring that extends to its side. The second opening can be positioned either to close in synchronism or not with closure of the first opening. The second slide opening can also be accessible only when there is the maximum flow desired. In this case, the second opening increases the maximum deliverable water flow but it is shut off by the guide ring as soon as the slide is shifted away from the maximum flow position so as not to disturb the operation of the blades and slots when the water flow is significantly throttled.

The notch of the guide ring can also include, if necessary, a range of blades or other equivalent devices for quieting the flow. The control slide and the guide ring can be produced from injection molded plastics; therefore, the production costs can be competitive with other conventional faucets.

BRIEF DESCRIPTION OF THE DRAWINGS

Reference is now made to the accompanying drawings in which.

DESCRIPTION OF THE PREFERRED EMBODIMENT

Figure 1:
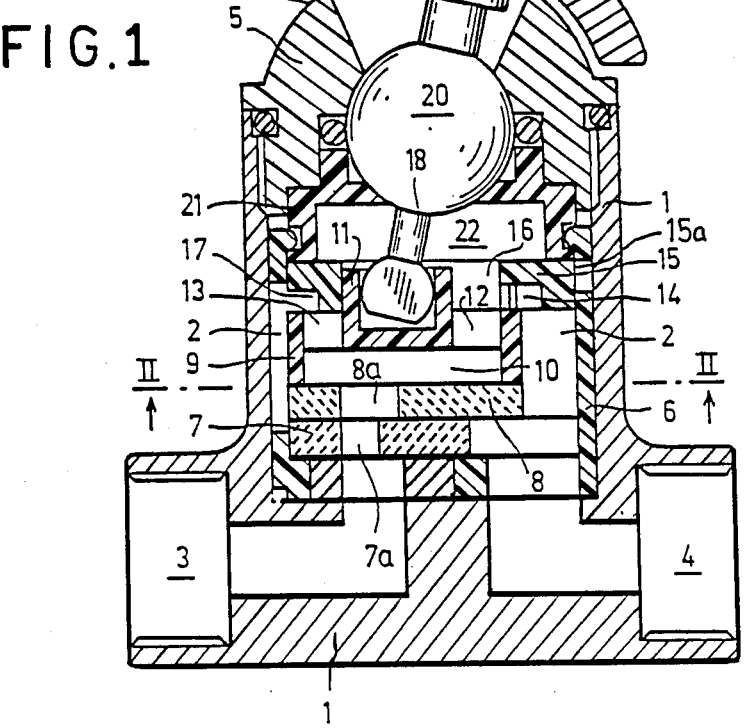
FIG. 1 shows a side elevational and segmented view of a mixing valve according to the invention shown in the fully open position when the water flow is delivered at its maximum.

Referring to FIG. 1, a single handle faucet includes a replaceable cartridge fitted in a hollow body 1 provided with the inlet fittings 3 (only one can be seen in the drawing) for the connection of two water supply pipes, cold and hot, and provided with an annular space 2 communicating with a connection spout 4. The body 1 is closed by cap 5 which is in this case screwed into the body 1.

A replaceable cartridge is introduced into the cavity of the body and fixed in place by the cap 5 and containing the valve mechanism of the faucet. The cartridge consists of a shell 6, having a fixed plate 7 of hard material placed therein. The plate 7 has two passage inlets 7a (only one can be seen in the drawing) communicating with their respective inlet fittings 3. A movable plate 8 is slidably mounted on fixed plate 7. The movable plate 8 is made from hard material, such as ceramic, and has two suitably shaped apertures 8a (only one can be seen in the drawing). The apertures 8a cooperate with the passage outlets 7a of the fixed plate 7, so as to regulate the delivered water flow and the mixing ratio of the two liquids fed in the faucet through the inlet fittings 3 as plate 8 slidably moves about on plate 7.

The movable plate 8 is then fixed to a slide member called a control head 9 which, through a raised portion 11, is guided into a diametral window 16 of a rotatable guide ring 15, commonly referred to as a control ring, rotatably mounted into the shell 6 of the cartridge. The raised portion 11 of the head 9 has a flat recess where it engages a pin 18 forming the second arm of a control lever 19 which has a ball 20 as fulcrum. The ball 20 is placed between the cap 5 and an internal half bearing 21 forming a part of the shell 6 of the cartridge. The control ring 15 abuts against the inside surface of the internal half bearing 21 and exerts onto the cap 5 the pressures driven onto it by the movable parts of the faucet. Some holding seals which are not indicated by reference numerals are placed properly positioned to stop any leakage. The above mentioned cartridge structure and seals are not substantially different from the known structure as described in U.S. Pat. No. 4,325,403 to Uhlmann which is incorporated herein by reference.

Figures 2, 3:
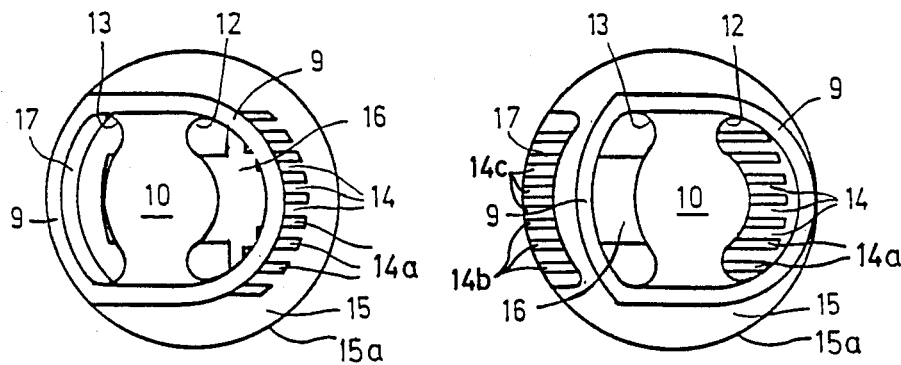
FIG. 2 shows the control slide and the control ring seen from II—II in FIG. 1.
FIG. 3 shows the same parts as FIG. 2 but when the water flow is intercepted by the control slide and control ring.

Referring to FIGS. 1 and 2, the control head 9 has a box-like structure having at least an internal cavity 10 in communication with the apertures 8a of the movable plate 8 and, on the side abutting the ring 15, it has a first outlet 12 and a second outlet 13 opposite the first one. These outlets 12 and 13 have been represented extending themselves without interruption over the total width of the internal cavity 10 in head 9, but they could be smaller or interrupted by strengthening connections such as ribs. The outlets 12 and 13 face a cavity of the ring 15 formed by its diametral window 16. The cavity can be advantageously made larger by an adjoining chamber 22 formed in the half bearing 21. A plurality of parallel slots 14a in the surface of the ring 15 that abuts the slide 9, extend from window 16 toward the annular space 2 that communicates with the connection spout 4. A series of comb-like teeth blades 14 lie between these slots 14a. There are preferably eight blades with nine slots about them. However, fewer slots and blades can be functional. As few as four blades and five slots can be used for adequate operation. The slots do not reach the side wall 15a of the control ring 15 but it stops at some distance from the side wall. These slots are located to be at least partially covered, or as shown in FIG. 3 completely hidden, by the head 9 before the head 9 reaches the completely off position.

On the opposing side of the ring from the blades 14, the lower surface of the ring 15 has a peripheral notch 17. Optional blades 14b and 14c shown in FIG. 3, similar to those blades 14 and slots 14a or some other equivalent noise reducing devices can be installed therein.

In operation, as shown in FIG. 1, when the head 9 is in such a position so that the movable plate 8 allows the delivery of the maximum water flow, the first outlet 12 of the head 9 drives the mixed flow to the window 16 and chamber 22. From here, the flow passing into the slots 14a between the blades 14, reaches the annular space 2 and the spout connection 4. In addition, the second outlet 13 of the head 9 is aligned under the peripheral notch 17 of the ring 15; therefore, a portion of the mixed water flows therethrough toward the annular space 2. The resistances opposed to the flow between the movable plate 8 and the spout connection 4 are significantly reduced and the maximum flow rate is increased.

As soon as the head 9 is shifted toward positions of partial throttling, the second outlet 13 is misaligned from the peripheral notch 17 of the ring 15, and it does not allow the passage of a high flow rate any more. The outlet 13 and the notch 17 extend themselves a great deal in circumferential length and only slightly in radial dimension. They allow the passage of a great quantity of water flow when aligned. However, a slight shifting of head 9 quickly reduces the alignment of outlet 13 with notch 17 and throttles the passage of water therethrough. In the conditions of moderate flow, the mixed water flow passes through the opening 12 and is resisted in its 180° diversion by the passage into the window 16, chamber 22, and slots 14a among the blades 14. When the head 9 approaches the condition of interception, it increasingly throttles the passage through slots 14a among the blades 14. The slots 14a and blades 14 provide for quieter flow in this condition.

The head 9 eventually closes off slots 14a as shown in FIG. 3. At this point, the flow (which has a very reduced rate because it is almost completely intercepted by the cooperation of the plates 7 and 8) can pass out of the cavity 10 of the slide 9 only through the play existing between the head and the control ring 15. The flow is therefore slowed down very much and its noise is significantly reduced.

The head 9 and the control ring 15 are usually produced from injection molded plastics. The addition to the usual faucet parts foreseen by the invention requires only a modification of the molds and does not cause any relevant increase of the production cost of the components. The faucet can comprise a cartridge or can be of a kind whose components are directly mounted in the body and its working devices can be of any known kind. The fixed plate 7 and the movable plate 8 can also vary with the inlets and apertures being suitably shaped. The blades 14 (and similar optional blades in the notch 17) can extend to the surface where they abut against the head 9 or stop at a point slightly above head 9. The blades 14 (and the optional blades in the notch 17) could be joined together by lowered transversal baffles, thus defining stagnation cavities or they could be otherwise interrupted by then assuming a brush-like form. The second outlet 13 of the head and the peripheral notch 17 of the control ring 15 can be arched about different radii counterbalancing the effects of possible production imperfections.

Furthermore, the window formed in the head 9 could be subdivided into two parts or more for delaying mixing of the water until after flowing out of the head. Finally, although the main application field of the invention relates to the mixing valves, the application to simple faucets could be possible too.

Variations and modifications of the present invention are possible without departing from the scope and spirit as defined in the appended claims.

I claim:

1. A faucet valve characterized by:
   a fixed valve seat means having at least one passage opening in communication with at least one supply line;
   a movable valve plate slidably mounted on said fixed valve seat means to selectively close or open said at least one passage;
   a slide member fixed to said movable valve plate having a cavity in communication with said at least one passage when said valve plate is positioned to open said at least one passage and an outlet from said cavity;
   a control guide member for guiding said slide member and having a window therein in communication with said outlet of said slide member;
   said window having a slotted section with alternating blades and slots positioned sufficiently close together to reduce noise as liquid flows therethrough and being positioned to be selectively intercepted by said slide member to be substantially closed off by said slide member from an outlet space exteriorly positioned from said slide member when said slide member is positioned to move said valve plate to substantially close off said at least one passage; and
   a control means for moving said slide member.

2. A faucet valve according to claim 1 further characterized by:
   the slide member having a second outlet turned toward the control guide member opposite the one having slots, the guide member having a peripheral notch in selective communication with the second outlet when said slide member is positioned to substantially open said at least one passage opening.

3. A valve according to claim 2 wherein the peripheral notch of the control guide member is provided with a series of blades.

4. A valve according to claim 1 wherein the blades abut against the slide member.

5. A valve according to claim 1 wherein the blades extend near but are spaced from said slide member.

6. A valve according to claim 2 wherein the second outlet of the slide member and the peripheral notch of the guide member are arched and have different radii.

* * * * *